(12) United States Patent
Armas et al.

(10) Patent No.: US 7,975,560 B2
(45) Date of Patent: Jul. 12, 2011

(54) MAGNETIC SHIELD FOR WATER METER

(75) Inventors: Rolando Armas, Ocala, FL (US); Evan Hengge, Melbourne Beach, FL (US)

(73) Assignee: Elster Amco Water, Ocala, FL (US)

( * ) Notice: Subject to any disclaimer, the term of this patent is extended or adjusted under 35 U.S.C. 154(b) by 565 days.

(21) Appl. No.: 12/197,944

(22) Filed: Aug. 25, 2008

(65) Prior Publication Data

US 2009/0107253 A1    Apr. 30, 2009

Related U.S. Application Data

(60) Provisional application No. 60/983,696, filed on Oct. 30, 2007.

(51) Int. Cl.
*G01F 15/00* (2006.01)
*G01F 15/06* (2006.01)
*G01F 15/14* (2006.01)

(52) U.S. Cl. .................... 73/861.78; 73/861.77; 73/273; 73/275

(58) Field of Classification Search ............... 73/861.77, 73/861.78, 273, 275
See application file for complete search history.

(56) References Cited

U.S. PATENT DOCUMENTS

| 2,857,763 | A | * | 10/1958 | Hague et al. ................. 73/257 |
|---|---|---|---|---|
| 3,685,353 | A | | 8/1972 | Gestler et al. |
| 3,720,106 | A | | 3/1973 | Varga |
| 3,772,917 | A | | 11/1973 | Lutz et al. |
| 3,835,706 | A | | 9/1974 | Varga |
| 3,949,606 | A | * | 4/1976 | Blancett ................. 73/861.87 |
| 4,253,341 | A | | 3/1981 | Ikeda et al. |
| 6,098,456 | A | | 8/2000 | Munck |
| 6,333,626 | B1 | | 12/2001 | Edwards |
| 6,611,769 | B2 | | 8/2003 | Olson |
| 6,681,645 | B1 | * | 1/2004 | Feller ................. 73/861.71 |
| 6,819,292 | B2 | | 11/2004 | Winter |
| 6,954,178 | B2 | | 10/2005 | Winter |
| 7,126,551 | B2 | | 10/2006 | Winter |
| 2004/0056807 | A1 | | 3/2004 | Winter |
| 2005/0212710 | A1 | | 9/2005 | Winter |
| 2007/0109209 | A1 | | 5/2007 | Winter |

* cited by examiner

*Primary Examiner* — Lisa M Caputo
*Assistant Examiner* — Jonathan Dunlap
(74) *Attorney, Agent, or Firm* — Woodcock Washburn LLP

(57) ABSTRACT

A magnetic shield may be mounted to a water meter housing to protect the magnetic operation of the water meter from a tamper magnet, including both smaller, flexible tamper magnets and larger, strong tamper magnets. The shield may include a contoured portion and a barrier portion. The barrier portion may provide a physical and spatial barrier between a larger tamper magnet and an internal magnetic sensor of the water meter. The contoured portion may conform to the housing of the water meter and may prevent smaller tamper magnets from being maneuvered close to the housing of the water meter. The shield may be made of a ferrous material suitable for attenuating a magnetic field. The shield may receive a looped sensor transmission cable within a U-shaped opening enabling the shield to be installed and/or removed from the water meter without the sensor transmission cable being detached from the water meter.

20 Claims, 7 Drawing Sheets

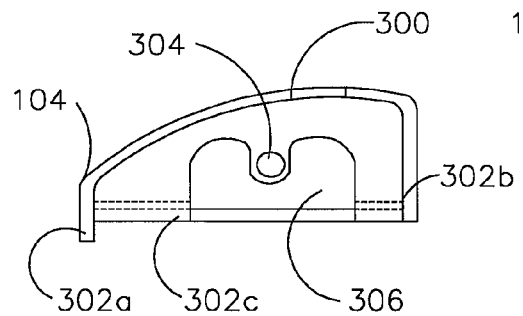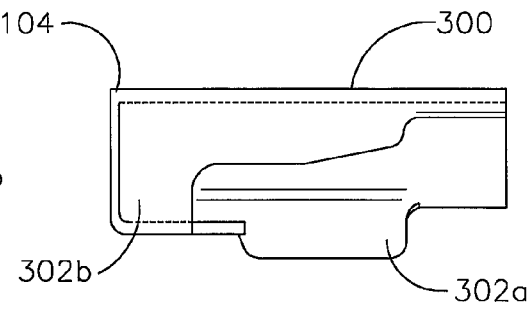
FIG. 3A  FIG. 3B
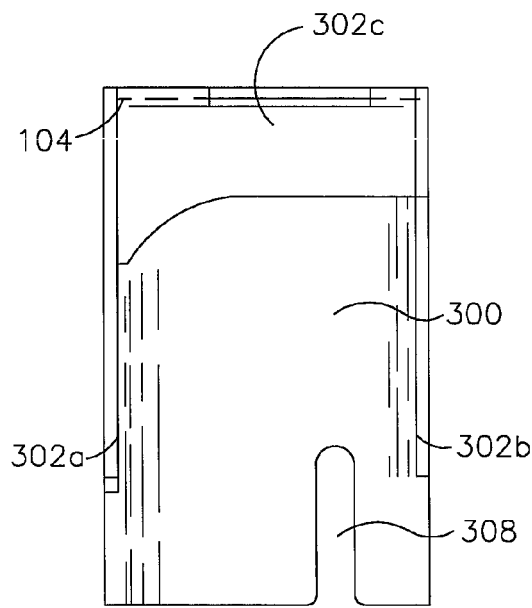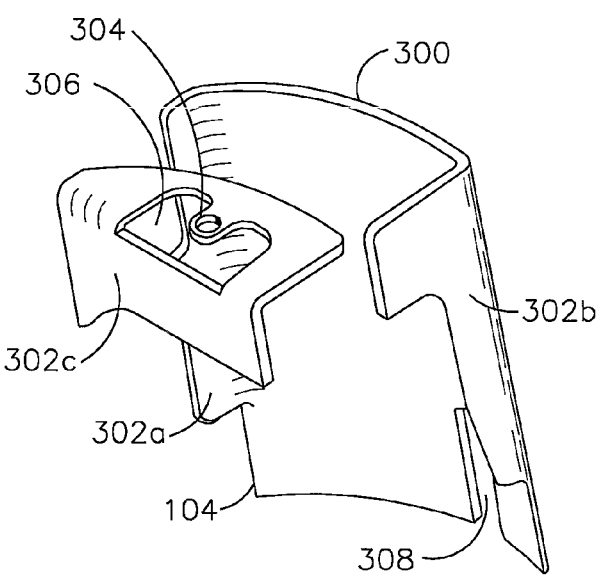
FIG. 3C  FIG. 3D

MAGNETIC SHIELD FOR WATER METER

CROSS REFERENCE TO RELATED APPLICATIONS

This application claims the benefit of U.S. Provisional Application 60/983,696 filed Oct. 30, 2007, the content of which is incorporated herein by reference in its entirety.

BACKGROUND

Water meters are used to measure the volume and/or the rate of the flow of water. A water meter may include a mechanical system, such as a propeller, a disc, a piston, or the like, that moves in relation to the water flowing through the meter. The mechanical system may drive a magnet that generates a magnetic field that changes in relation to the water flowing through the water meter. A sensor, sensitive to the magnetic field, may detect the changes in the magnetic field and generate a corresponding electrical signal. The signal may be measured locally or transmitted to a remote location to be measured. The measured signal may be translated into a metric, such as water volume, rate of flow, or the like.

Tampering may disrupt the operation of the water meter and affect the resulting metric. For example, where there is a monetary charge as a function of the volume of water consumed, there may be a motivation to tamper with operation of the water meter to make the meter report a value less than the actual amount of water consumed. Water meters that use a changing magnetic field may be susceptible to magnetic tampering.

SUMMARY

A shield is disclosed herein that protects the magnetic operation of a water meter from tamper magnets, including both smaller, flexible tamper magnets and larger, strong tamper magnets. The water meter may include a magnetic sensor inside a housing. The magnetic sensor may measure a changing magnetic field that corresponds to a quantity of water flow (e.g., volume and/or rate) in relation to the water meter.

The shield may include a contoured portion and a barrier portion connected to the contoured portion. The barrier portion may provide a physical and spatial barrier between an external tampering magnet and the internal magnetic sensor of the water meter. The contoured portion may conform to the housing of the water meter. The contoured portion may include a first side, a second side, and a top side. The contoured portion may prevent smaller magnets from being maneuvered close to the housing of the water meter. The contoured portion may define a distance between the barrier portion and the internal magnetic sensor of the water meter. The distance may be suitable for shielding the internal magnetic sensor from larger, stronger magnets.

The shield may be made of a ferrous material suitable for attenuating a magnetic field from the tampering magnet. For example, 1008 low carbon steel may be used. The steel may have 16 gauge metal thickness, which may be suitable for both attenuating magnetic fields and for manufacturing.

The top portion may include a hole for receiving an anti-tamper screw. The top portion may include a U-shaped opening suitable for receiving a looped sensor cable. This feature may enable the shield to be installed and/or removed from the water meter without the sensor cable being detached.

BRIEF DESCRIPTION OF THE DRAWINGS

FIGS. 3A-D depict an example magnetic shield in top, side, front, and 3-D rendered views, respectively.

DETAILED DESCRIPTION

A tamper magnet 100, placed in the vicinity of a water meter 102, may disrupt the changing magnetic field generated by the water meter 102 and the sensor's response to that changing magnetic field. Magnets may vary in strength, and the strength of the magnet may relate to its effectiveness at disrupting operation of the water meter 102.

Magnets come is varying sizes and shapes, ranging from small, weak magnets to large, strong magnets. Smaller magnets, such as refrigerator magnets, may be easily obtainable, but such magnets are generally weak, having lower gauss or flux ratings. Smaller magnets may be flexible, suitable for being maneuvered in close proximity to sensitive areas of a water meter 102; however, smaller magnets may lack the strength to have an appreciable effect on the operation of the water meter 102.

Larger magnets, such as commercial-grade magnets, may be expensive and difficult to obtain. Such magnets are generally stronger, having higher gauss or flux ratings. Large magnets may be difficult to position in close proximity to sensitive areas of a water meter 102; however, large magnets may be more effective disrupting the generated magnetic field, at a distance, than smaller magnets.

The shield 104 disclosed herein protects the magnetic operation of a water meter 102 from a tamper magnet 100, including both smaller, flexible tamper magnets and larger, strong tamper magnets.

Figure 1A:
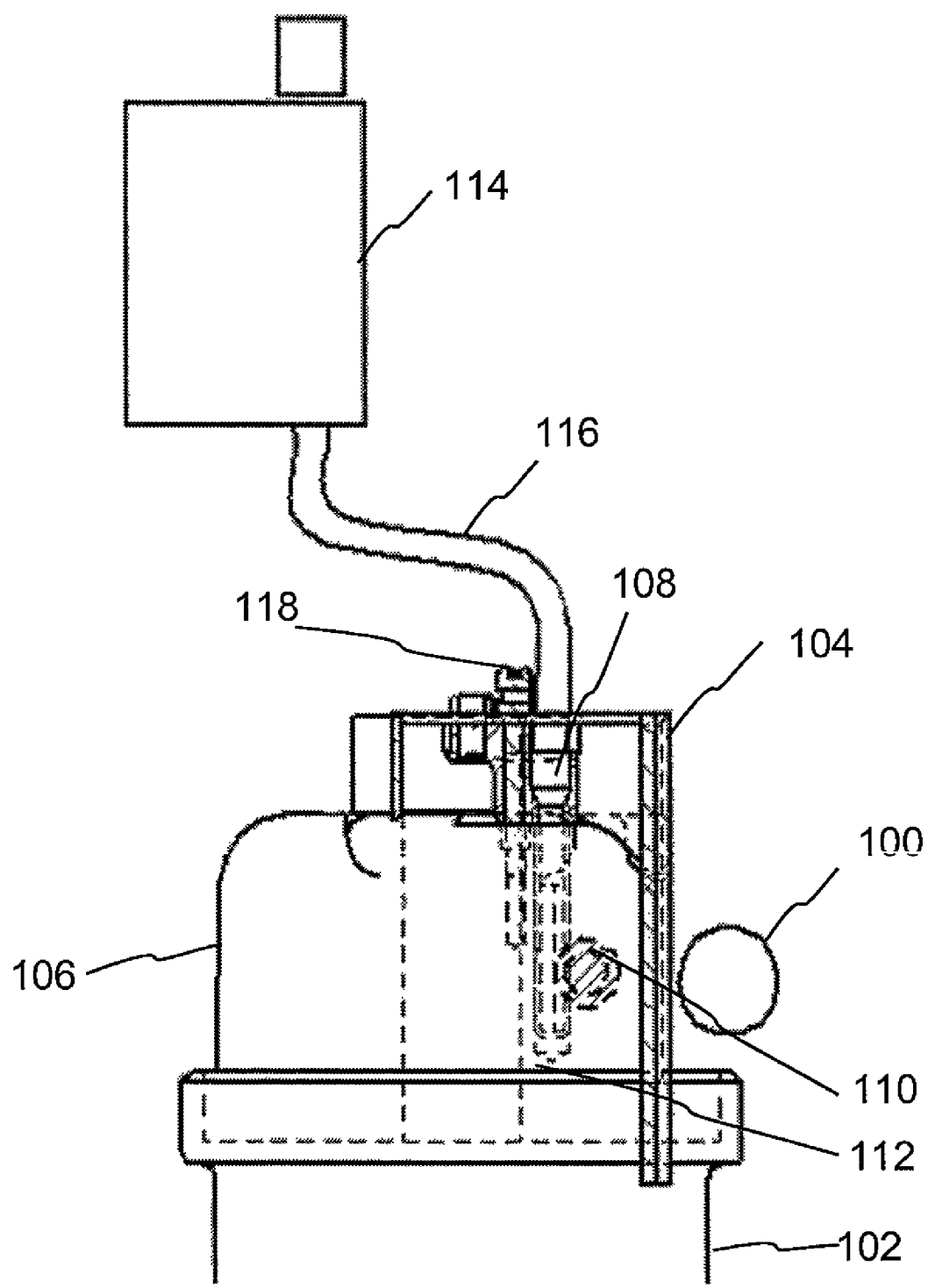
FIGS. 1A & B depict a radio-equipped water meter with an example magnetic shield in assembled and exploded views, respectively.
Figure 1B:
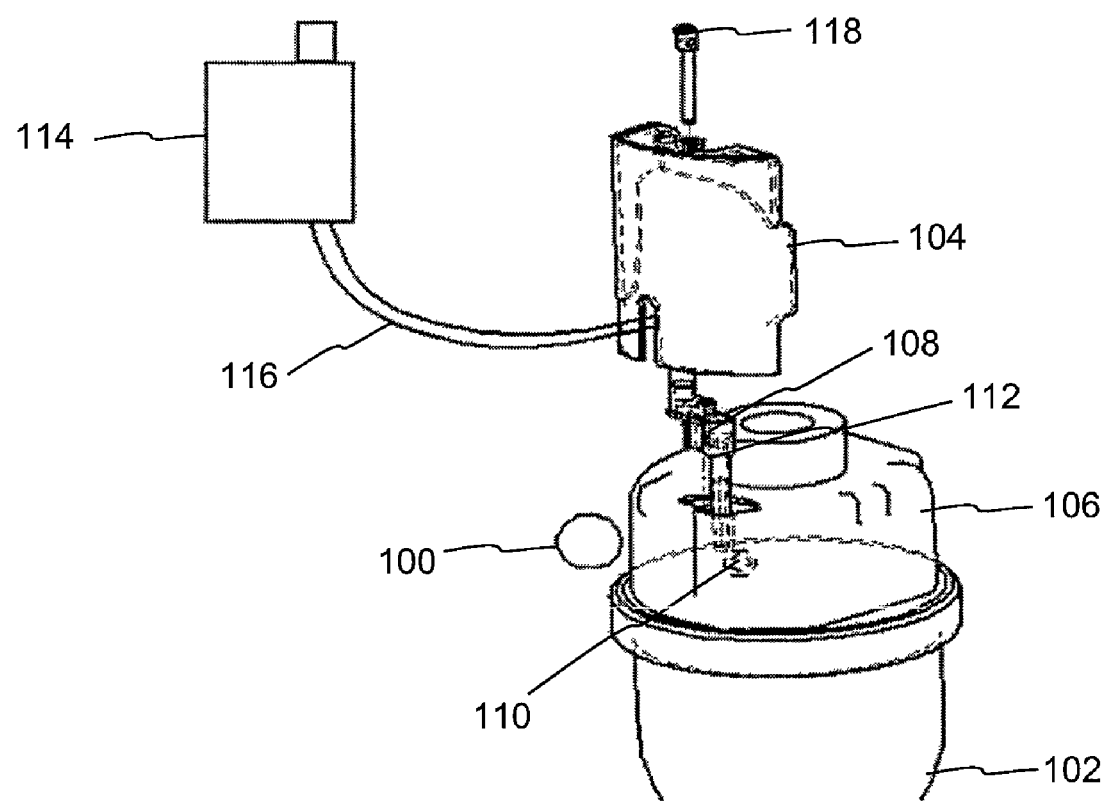

FIGS. 1A & B depict a radio-equipped water meter 102 with an example magnetic shield 104 in assembled and exploded views, respectively. The water meter 102 may include a housing 106 that encloses an electronic probe 108 (with magnetic sensor 112, for example) and a water meter internal pickup magnet 110. For example, the water meter 102 may be a V100T water meter (by Elster). The shield 104 may protect the operation of the internal pickup magnet 110 and the electronic probe 108 from outside tampering, such as an external tamper magnet 100. The shield 104 may absorb some of the magnetic field generated by the external tamper magnet 100. The shield 104 may establish a distance between the external tamper magnet 100 and the internal pickup magnet 110. The combination of the distance and the absorption may sufficiently attenuate the magnetic field from external tamper magnet 100, reducing its affect on the internal pickup magnet 110 and the magnetic sensor 112.

The water meter 102 may measure the flow of water and/or the volume of water related to it. For example, the water meter 102 may be equipped with a pipe through which water flows. The water flowing through the pipe may be measured by the water meter 102. The water flowing through the pipe may physically interact with a mechanical system within the water meter 102. For example, the water flowing through the pipe may drive an impeller, a rotating disk, a piston, or the like. The water may drive the mechanical system to provide motion of the internal pickup magnet 110. For example, the internal pickup magnet 110 may rotate in a manner that corresponds to the volume and/or rate of flow of the water.

The pickup magnet may have a north pole and a south pole. The motion of the magnet may generate a changing magnetic field associated with the internal pickup magnet 110. The changing magnetic field may correspond to the volume and/or rate of flow of the water. For example, the internal pickup magnet 110 may rotate once for each unit of volume that passes through the water meter 102. The change in magnetic field from north pole to south pole and back again may represent any number of (e.g., one or two) units of volume. Also for example, the internal pickup magnet 110 may rotate in relation to the rate of flow of the water through the water meter 102. The rate of change in the magnetic field from north pole to south pole and back again may represent the velocity of the flow of water through the water meter 102. Given a fixed width through which this velocity is being measured, the volume of the water flowing through the water meter 102 may be determined.

The electronic probe 108 may house a magnetic sensor 112, such as a magnetic switch. The magnetic sensor 112 may sense the changing magnetic field generated by the moving internal pickup magnet 110. The magnetic sensor 112 may translate to changing magnetic field into a corresponding changing electrical signal. For example, the magnetic sensor 112 may generate electrical pulses associated with each rotation of the magnet. In an embodiment, each electrical pulse may represent one unit of volume of water passing through the water meter 102. In an embodiment, the magnetic sensor 112 may generate a sine wave corresponding to the angular position of the internal pickup magnet 110.

The magnetic sensor 112 may be a reed switch. The reed switch may open and close according to the rotation of the internal pickup magnet 110. The opening and closing of the reed switch may generate electrical pulses. In a volumetric meter, counting the pulses may indicate the volume of water measured by the water meter 102.

The magnetic sensor 112 and/or pickup magnet 110 may be proximate to an exterior wall of the water meter housing 106. For example, the magnetic sensor 112 may be closer to one wall of the water meter housing 106 than it is to another wall of the water meter housing 106. For example, the internal mechanisms that drive the operation of the water meter 102 may dictate a position of the magnetic sensor 112 proximate to an exterior wall of the water meter 102. As a result, the magnetic sensor 112 may be more sensitive to a tampering magnet that is outside of the exterior wall to which the magnetic sensor 112 is proximate. In an embodiment, the shield 104 may provide magnetic shielding with regard to a portion of the exterior wall of the water meter housing 106 defining a shielded portion and an unshielded portion of the water meter housing 106. Because the magnetic sensor 112 may be proximate to the shielded portion of the exterior wall of the water meter housing 106, the shield 104 and shielded portion of the exterior wall of the water meter housing 106 may provide magnetic shielding for the magnetic sensor 112 approximately equal to that provided by the unshielded portion, thus, protecting the magnetic sensor 112 from a tamper magnet 100 placed at an point along the exterior wall of the water meter housing 106.

The output of the magnetic sensor 112 may be delivered in a human readable format. The output of the magnetic sensor 112 may drive a display local to the water meter 102, such as a mechanical numeric display mounted to the water meter 102 and/or in close proximity to the water meter 102. The local display may be connected to the magnetic sensor 112 via a cable 116. The output of the magnetic sensor 112 may drive the display at a remote location via a radio communication channel. A radio transmitter 114 may be connected to the magnetic sensor 112 via a cable 116. The display may translate the output of the magnetic sensor 112 into a human readable representation of the volume of water being measured by the water meter 102. In an embodiment, a processor local to the water meter 102 may translate the output of the magnetic sensor 112 into a signal and/or data indicative of the volume of water being measured by the water meter 102. The output of the processor may drive a local and/or remote display. For example, the output of the processor may be communicated via the radio to a remote display.

The external tamper magnet 100 may be presented by one who wishes to tamper with the operation of the water meter 102. For example, a criminal may wish to disrupt the operation of the water meter 102, such that the water meter 102 reports a volume of water less than that which has passed through the water meter 102. Where there is a fee associated with the volume of water consumed, a criminal with an external tamper magnet 100 may receive more water than the criminal is entitled.

The external tamper magnet 100 may create a magnetic field that disrupts the operation of the magnetic sensor. The external tamper magnet 100 may overpower the internal pickup magnet 110, such that the magnetic sensor 112 responds to the external tamper magnet 100 rather than responding to the internal pickup magnet 110. For example, the external tamper magnet 100 may cause the reed switch to stay in the closed position regardless of the motion of the internal pickup magnet 110. This would result in the suppression of electrical pulses at the output of the sensor, even though water is flowing through the water meter 102. Thus, the human readable representation of the volume of water would be less than what has actually flowed through the water meter 102.

Small magnets, such as flexible flat refrigerator style magnets may generate about 45 gauss of magnetic field. Household magnets, such as those commonly available in hardware stores, may generate between about 500 and 1000 gauss. Commercial magnets, which tend to be expensive and not widely available, may generate between about 1600 to 2900 gauss.

A reed switch water meter 102, without a shield 104, may be vulnerable to magnets that generate over 800 gauss. To reduce the effect of the external tamper magnet 100, the shield 104 may attenuate the magnetic field generated by the external tamper magnet 100.

The shield 104 may be mounted to the water meter 102 via an anti-tamper screw 118. The anti-tamper screw 118 may include a wire passing therethrough that would have to be disconnected in order to remove the anti-tamper screw 118. Disconnecting the wire may provide an indication that the anti-tamper screw 118 has been removed. The anti-tamper screw 118 may require a special, non-standard bit to be driven and/or removed. The shield 104 should be kept close to the meter housing 106 to minimize the overall size of the water meter 102 with shield 104. The smaller overall footprint may increase the spaces in which the water meter 102 may be installed in the field.

Figure 2A:
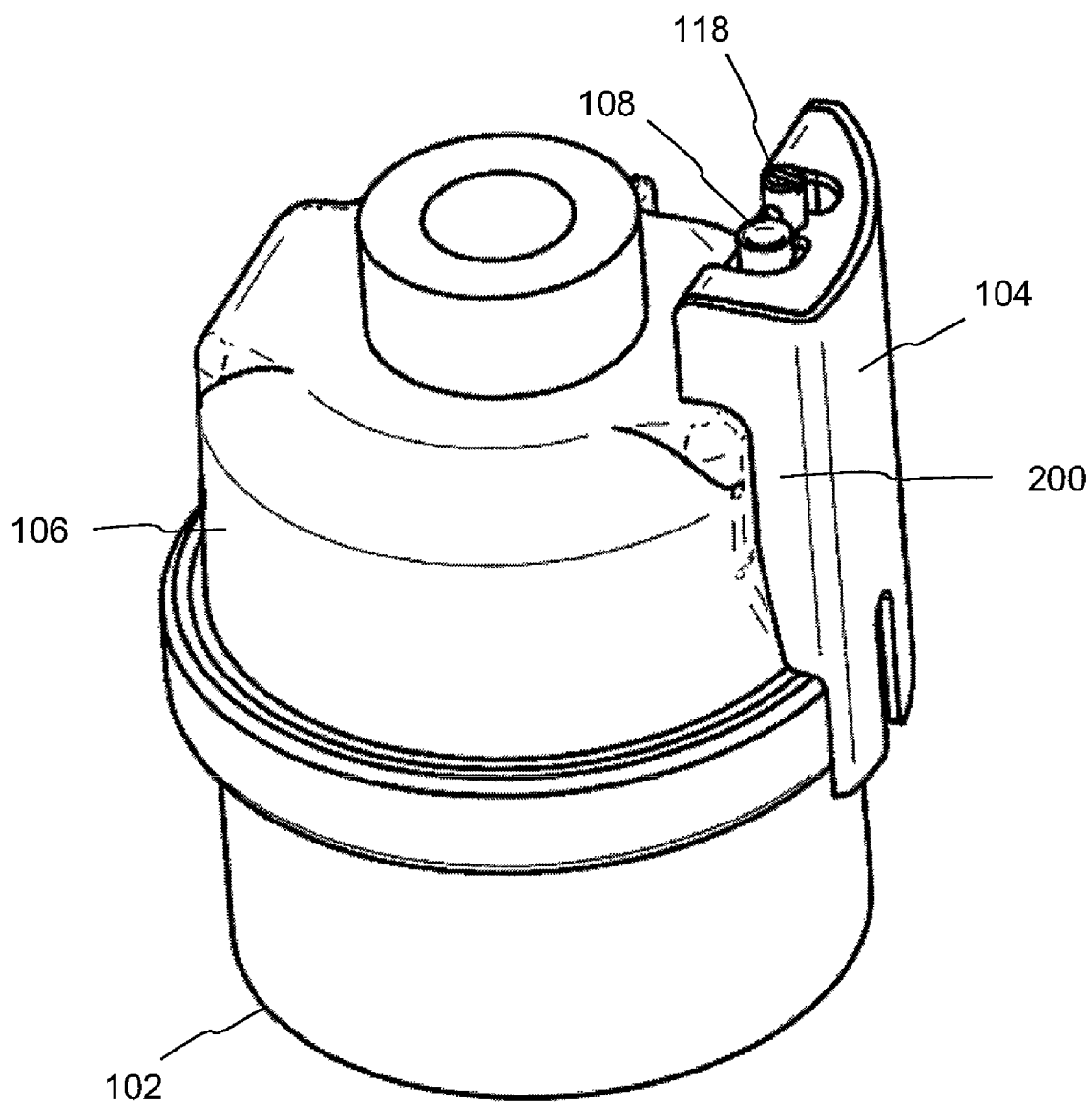
FIGS. 2A & B depict a water meter with an example magnetic shield in assembled and exploded views, respectively.
Figure 2B:
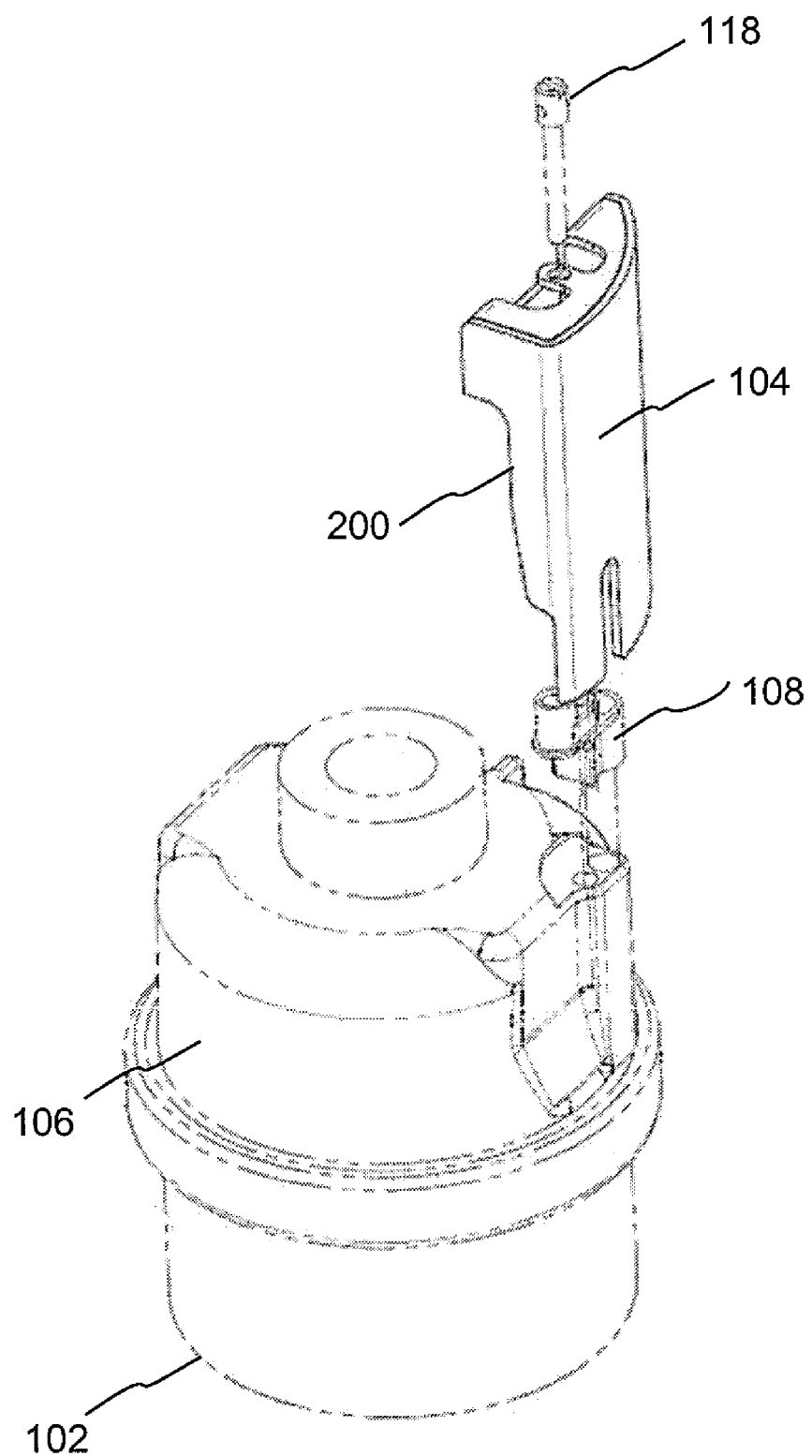

FIGS. 2A & B depict a water meter 102 with an example magnetic shield 104 in assembled and exploded views, respectively. The shield 104 may establish a physical barrier between the internal pickup magnet 110 and the external tamper magnet 100. The physical barrier may define a minimum distance between the internal pickup magnet 110 and the external tamper magnet 100. This minimum distance may attenuate the magnetic field generated by the external tamper magnet 100. The shield 104 may absorb a portion of the magnetic field generated by the external tamper magnet 100. This absorption may attenuate the magnetic field generated by the external tamper magnet 100. The shield 104 may be contoured to the shape of the water meter housing 106. The contour may prevent smaller magnets from being maneuvered between the shield 104 and the water meter housing 106.

Various aspects of the shield 104 may be modulated to accommodate for protection from magnets of various size and strength, for example, the distance between the external tamper magnet 100 and the internal magnetic sensor, the type of metal from which the shield 104 is made, the thickness of the shield 104, and the nature of the contours.

Since commercial magnets may not be an economically feasible approach for water theft, the shield 104 may provide a reasonable protection from large external tamper magnets via the distance between the external tamper magnet 100 and the internal magnetic sensor and the type and thickness of the metal. The shield 104 may be made of any ferrous material, such as steel, mu-metal, or the like. The shield 104 may be coated in yellow zinc chromate to prevent rusting.

Since smaller magnets and household magnets may be commonly available, the shield 104 may provide reasonable protection by contouring the shield 104 to the shape of the water meter 102. The contouring may prevent smaller magnets from being maneuvered close to the internal magnetic sensor. As shown in FIGS. 2A & B, the shield 104 may have side portions 200 that are shaped to match the shape of the water meter 102 to which the shield 104 is mounted.

In an embodiment, the shield 104 may be made of 1008 low carbon steel. The 1008 low carbon steel may have a 16 gauge thickness. The 16 gauge thickness provides substantial magnetic absorption while still being thin enough for easy manufacture. The minimum distance between the outer surface of the shield 104 and the internal sensor may be about 5/16" (about 8 mm). This embodiment, as mounted to a V100T meter, may provide adequate protection from magnets up to 1200 gauss.

FIGS. 3A-D depict an example magnetic shield 104 in top, side, front, and 3-D rendered views respectively. The magnetic shield 104 may include a barrier portion 300 and a contoured portion 302a-c. The barrier portion 300 and the contoured portion 302a-c may be connected. For example, the contoured portion 302a-c may extend from the barrier portion 300. For example, the contoured portion 302a-c may be welded to the barrier portion 300. For example, the contoured portion 302a-c may be a combination of extending from and being welded to the barrier portion 300.

The barrier portion 300 may be a metal wall. The barrier portion 300 may be curved. The barrier portion 300 may be substantially rectangle in shape. The barrier portion 300 may define a first edge and a second edge opposite the first edge. The first edge of the barrier portion 300 and the second edge of the barrier portion 300 may be longitudinal edges.

The barrier portion 300 may define a third edge between the first edge and the second edge. The barrier portion 300 may have a notch 308 extending from the third edge. For example, the notch 308 may be sized to receive a 26 gauge wire. The notch 308 may extend in a longitudinal direction from the third edge.

The contoured portion 302a-c may include a first contoured side 302a, a second contoured side 302b, and a contoured top side 302c. The first contoured side 302a and the second contoured side 302b may each define a respective mating edge and a respective common edge. The top side may define a respective mating edge and a mounting edge, opposite the mating edge.

The first contoured side 302a and the second contoured side 302b may extend from the barrier portion 300. The common edge of the first contoured side 302a may be shared with a first edge of the barrier portion 300. The common edge of the second contoured side 302b may be shared with a second edge of the barrier portion 300.

The top side may be mounted to the barrier portion 300. The barrier portion 300 may define a fourth edge between the first edge and the second edge. The fourth edge may be opposite the third edge. The mounting edge of the topside may be welded to the fourth edge of the barrier portion 300.

The respective mating edges of the first contoured side 302a, the second contoured side 302b, and the top side may be adapted for a close fit to an associated water meter housing 106. The respective mating edges may be shaped to the water meter housing 106 such that an approximately 2.5 mm×2.5 mm×5 mm sized magnet would be prevented from fitting between the shield 104 and the water meter housing 106. A magnet smaller than this may not have the strength to affect the magnetic sensor.

The top side may include a hole 304 for receiving the anti-tamper screw 118. The top side may include a u-shaped opening 306 for receiving a loop of wire. The hole 304 may be through the peninsula of metal defined by the U-shaped opening 306.

In an embodiment, the barrier portion 300 and contoured portion 302a-c may be made of 16 gauge thickness 1008 low carbon steel. The shield 104 may be stamped out in two pieces and welded together, as shown in FIG. 3D.

Figure 4A:
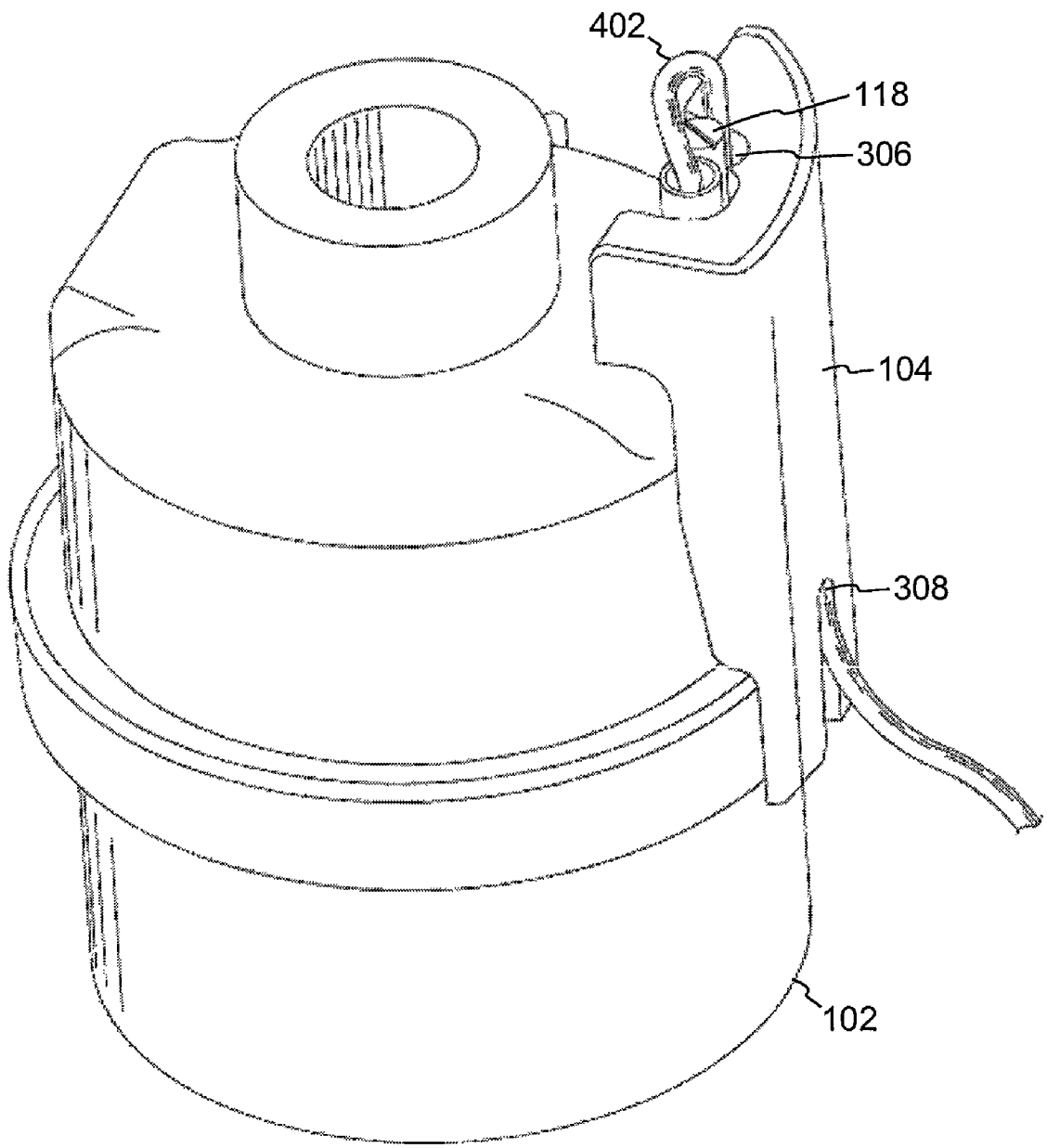
FIGS. 4A & B depict an example magnetic shield mounted to a water meter, where the example magnetic shield is receiving a looped sensor cable, shown in front and reverse views, respectively.
Figure 4B:
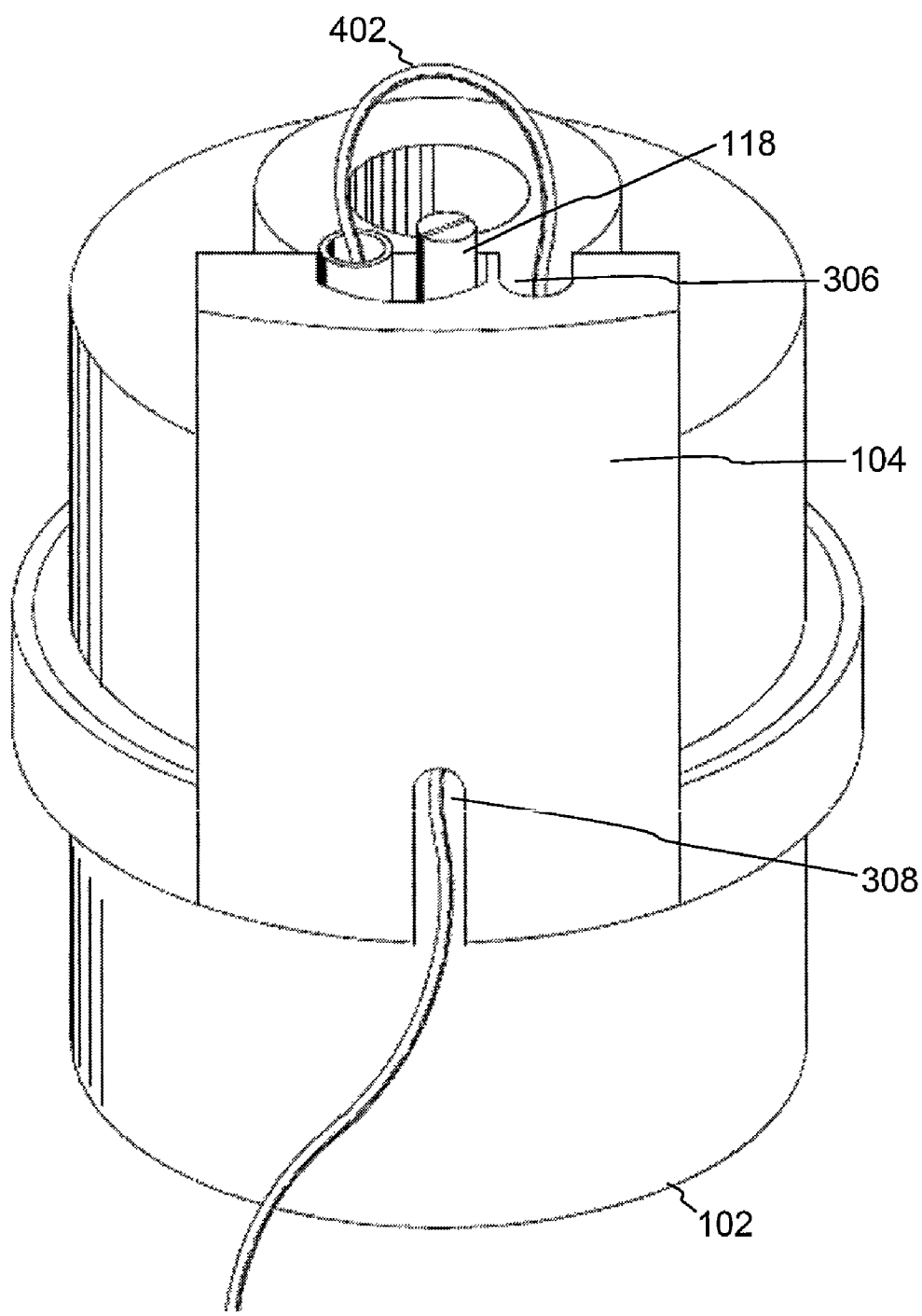

FIG. 4 depicts an example magnetic shield 104 mounted to a water meter 102, where the example magnetic shield 104 is receiving a looped wire 402, shown in front and reverse views respectively. When installing the shield 104 onto an existing, installed water meter 102, the anti-tamper screw 118 may be placed through a hole in the water meter housing and tightened. The wire 402 extending from the water meter 102 and to the radio transmitter (not shown), may be looped through the u-shaped opening 306 and passed through the notch 308. Thus, the shield 104 may be installed without removing and/or splicing the wire 402 between the water meter 102 and the radio.

What is claimed:

1. A water meter, comprising:
   a housing that defines an exterior wall;
   a magnetic sensor disposed in the housing, wherein the magnetic sensor converts movement of a pickup magnet in communication with a flow of water into a signal indicative of the flow of water;
   a cable that passes through the housing and that receives the signal; and
   a shield mounted to the exterior wall of the housing, wherein the shield comprises a contoured portion connected to a barrier portion, wherein the shield establishes a minimum distance between any point along an outer surface of the barrier portion and the magnetic sensor, wherein the shield is made of a ferrous material; wherein the minimum distance attenuates and the ferrous material absorbs a magnetic field of a tamper magnet placed at any point along the outer surface of the barrier portion, such that the magnetic field does not affect the operation of the magnetic sensor,
   wherein the shield establishes a maximum opening distance between any point along the exterior wall and the contoured portion preventing an approximately 2.5 mm×2.5 mm×5 mm sized tamper magnet from fitting between the shield and the housing, and wherein the shield defines an opening and a notch, wherein the opening receives a loop of the cable and a tail of the cable extends through the notch, such that the shield is demounted from the housing without removing the cable from the housing.

2. The water meter of claim 1, wherein the shield defines a shielded portion of the exterior wall and an unshielded portion of the exterior wall, wherein the magnetic sensor is disposed proximate to the shielded portion of the exterior wall, wherein the shield and the shielded portion of the exterior wall provide magnetic shielding of the magnetic sensor approximately equal to that of the unshielded portion.

3. A water meter, comprising:
a magnetic sensor disposed in a water meter housing, the water meter housing defining an exterior wall;
a magnetic shield mounted to the exterior wall of the water meter housing, wherein the magnetic shield comprises a barrier portion connected to a contoured portion that conforms to the exterior wall of the water meter housing, wherein the shield attenuates a magnetic field of a tamper magnet when present at any point along an outer surface of the barrier portion such that the magnetic field does not affect the operation of the magnetic sensor wherein the shield defines a shielded portion of the exterior wall and an unshielded portion of the exterior wall, wherein the magnetic sensor is disposed proximate to the shielded portion of the exterior wall, wherein the shield and the shielded portion of the exterior wall provide magnetic shielding of the magnetic sensor approximately equal to that of the unshielded portion.

4. The water meter of claim 3, wherein the magnetic shield defines a minimum distance between any point along the outer surface of the barrier portion and the magnetic sensor, wherein the minimum distance is selected to attenuate the magnetic field of the tamper magnet, such that the magnetic field does not affect the operation of the magnetic sensor.

5. The water meter of claim 4, wherein the minimum distance is selected to be approximately 5/16".

6. The water meter of claim 3, wherein the tamper magnet includes up to approximately 1200 gauss.

7. The water meter of claim 3, wherein the shield established a maximum opening distance between a point along the exterior wall and the contoured portion.

8. The water meter of claim 7, wherein the maximum opening distance is selected to be approximately 2.5 mm.

9. The water meter of claim 7, wherein the maximum opening distance is selected to prevent an approximately 2.5 mm×2.5 mm×5 mm sized magnet from fitting between the shield and the water meter housing.

10. The water meter of claim 3, wherein the shield is made of a ferrous material.

11. The water meter of claim 3, wherein the shield is made of 1008 low carbon steel.

12. The water meter of claim 3, wherein the shield is made of the approximately 16 gauge metal.

13. The water meter of claim 3, wherein the magnetic sensor is a reed switch.

14. The water meter of claim 3, further comprising a cable connecting the magnetic sensor to an external unit.

15. The water meter of claim 14, wherein the shield defines an opening proximate to a mounting portion of the shield and wherein the shield defines a notch disposed within the barrier portion of the shield, such that the cable loops within the opening and extends through the notch.

16. A magnetic shield adapted to mount to an exterior wall of a water meter housing, wherein the water meter has disposed therein a magnetic sensor, the magnetic shield comprising:
a contoured portion that conforms to the exterior wall of the water meter housing; and
a barrier portion that attenuates a magnetic field of a tamper magnet when present at any point along an outer surface of the barrier portion such that the magnetic field does not affect the operation of the magnetic sensor wherein the shield defines a shielded portion of the exterior wall and an unshielded portion of the exterior wall, wherein the magnetic sensor is disposed proximate to the shielded portion of the exterior wall, wherein the shield and the shielded portion of the exterior wall provide magnetic shielding of the magnetic sensor approximately equal to that of the unshielded portion.

17. The magnetic shield of claim 15, wherein the barrier portion defines a minimum distance between any point along the outer surface of the barrier portion and the magnetic sensor, wherein the minimum distance is selected to attenuate the magnetic field of the tamper magnet such that the magnetic field does not affect the operation of the magnetic sensor.

18. The water meter assembly of claim 3, wherein the tamper magnet includes up to approximately 1200 gauss.

19. The water meter assembly of claim 3, wherein the shield established a maximum opening distance between a point along the exterior wall and the contoured portion.

20. The water meter assembly of claim 7, wherein the maximum opening distance is selected to prevent an approximately 2.5 mm×2.5 mm×5 mm sized magnet from fitting between the shield and the water meter housing.

* * * * *

UNITED STATES PATENT AND TRADEMARK OFFICE
CERTIFICATE OF CORRECTION

| | | |
|---|---|---|
| PATENT NO. | : 7,975,560 B2 | Page 1 of 1 |
| APPLICATION NO. | : 12/197944 | |
| DATED | : July 12, 2011 | |
| INVENTOR(S) | : Rolando Armas et al. | |

It is certified that error appears in the above-identified patent and that said Letters Patent is hereby corrected as shown below:

COL. 7, line 7, delete "demounted" and substitute therefor --demountable--

Signed and Sealed this
Twenty-third Day of August, 2011

David J. Kappos
*Director of the United States Patent and Trademark Office*